July 2, 1968   H. H. GANSZ   3,390,938
FLOAT FOR SPECTACLES
Original Filed June 11, 1962
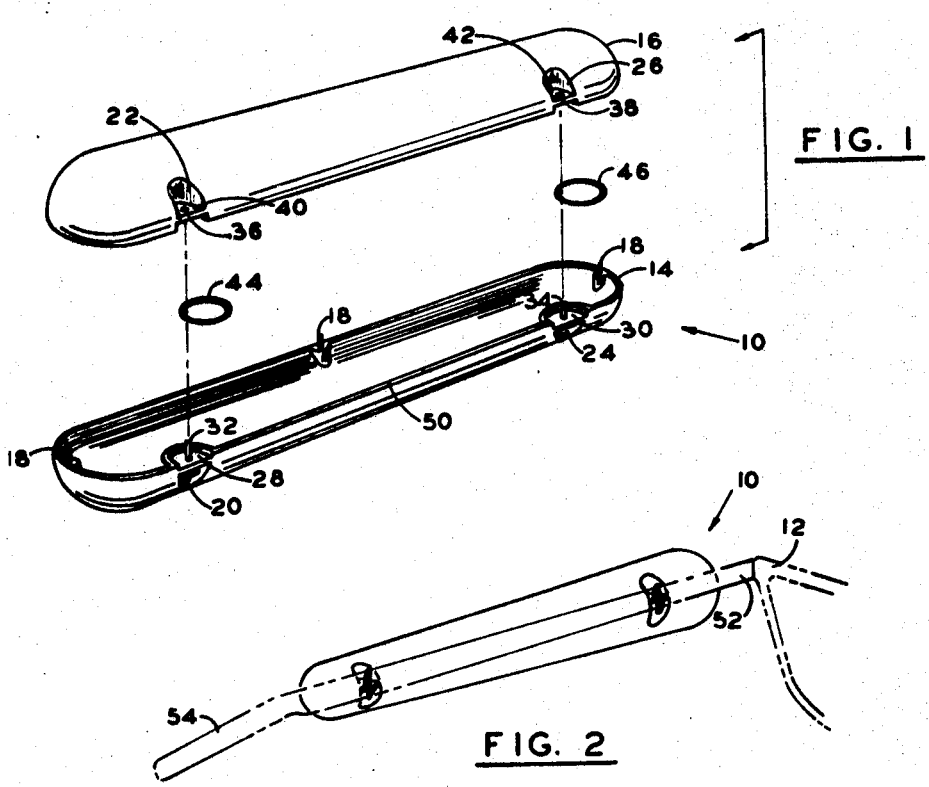
FIG. 1
FIG. 2
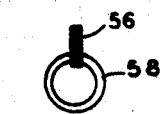
FIG. 3
FIG. 4
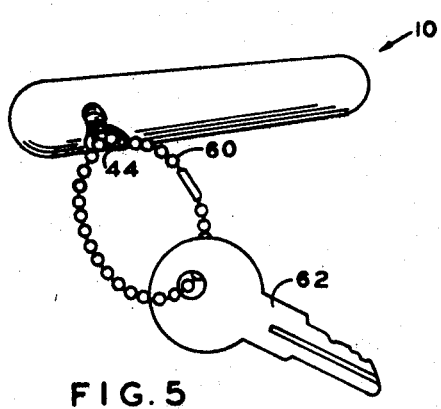
FIG. 5
INVENTOR.
HARRY H. GANSZ
BY Head & Johnson
ATTORNEYS

United States Patent Office 3,390,938
Patented July 2, 1968

3,390,938
FLOAT FOR SPECTACLES
Harry H. Gansz, Tulsa, Okla., assignor to Optic-Glass Float Company, Tulsa, Okla., a corporation of Oklahoma
Continuation of application Ser. No. 201,419, June 11, 1962. This application Apr. 13, 1967, Ser. No. 630,770
2 Claims. (Cl. 351—43)

ABSTRACT OF THE DISCLOSURE

A float for spectacles having a gas filled member with assembled resilient rings which are required to be twisted 90° in order to position same over the temple portion of spectacles to float the spectacles in the event they are accidentally dropped into a body of water.

---

Cross-references to related applications

This invention is a continuation of copending application S.N. 201,419, filed June 11, 1962, now abandoned in favor of this application, which prior application is a continuation-in-part of copending application S.N. 749,918, now U.S. Patent 3,038,375, issued June 12, 1962.

This invention relates to apparatus for floating objects in liquids. More particularly, it relates to a float or floats for preventing articles, such as spectacles or eyeglasses, from falling to the bottom of a body of water, such as a lake or river.

The principal object of this invention is to overcome the problem of losing spectacles or eyeglasses, or keys and the like, which may be accidentally dropped into a body of water while engaging in various water sporting activities such as fishing, boating, skiing and the like.

Another object of this invention is to disclose a hollow float apparatus for spectacles or eyeglasses and the like which is lightweight and not bothersome to the wearer thereof.

Additional objects and a better understanding of this invention may be had by referring to the following description and claims, when taken in conjunction with the accompanying drawings of which:

FIGURE 1 is an exploded perspective view of a float according to this invention.

FIGURE 2 is a partial perspective view describing the manner in which a float is attached to the temple portion of eyeglasses or the like.

FIGURES 3 and 4 represent an alternate attachment device.

FIGURE 5 represents an additional embodiment of this invention using the float herein for attachment to a key and chain.

Generally speaking, this invention relates to a low density or hollow float composed of a molded synthetic resin, such as polystyrene, polyethylene, or the like, and which ordinarily come in pairs for attachment to the temple portions of spectacles or eyeglasses.

Referring now to FIGURES 1 and 2, the exploded parts of the float 10 as manufactured for usual attachment to one temple portion of typical spectacles or eyeglasses 12 is illustrated. Ordinarily two of the floats are used—one on each temple portion—and are found to be adequate to float average eyeglasses in water. The float is formed from two pre-molded portions, a lower male shell 14 and an upper female shell 16. The lower male portion includes upwardly extending pins 18 spaced at various places around the edge of the float and which are adapted to engage and interlock within matching portions, not shown, in the upper female portion 16. Along one side of the float, recessed and indented portions 20 and 22 are formed in the lower and upper portions respectively. Similar recesses 24 and 26 are formed and spaced along the same edge and include, in the lower half 14, relatively horizontal portions 28 and 30 with extending pins 32 and 34. Pins 32 and 34 are adapted to engage within matching openings 36 and 38 formed within similar horizontal portions 40 and 42 respectively. Upon assembly of the float, O-rings 44 and 46, which are normally similar as to resiliency and composition, are preassembled upon pins 32 and 34 respectively, prior to applying glue or solvent along the outer peripherial edges 50 and thence snapping the upper portion in place. This locks the O-rings in a position between the horizontal portions wherein their axii are parallel to the pins or substantially 90° to a line along the outer periphery of the float parallel to the elongated axis of the float.

Typically, the float is made in such a manner as to be relatively larger in diameter at one end than it is at the other, forming a tapered streamlined appearance.

It is important to note that by placement of the resilient O-rings 44 and 46 in a position wherein the axii are normally at 90° to the aforesaid imaginary line which is parallel to the axis of the member such that when attached to the temple portion 52 of a typical spectacle frame the O-ring will be twisted somewhat in the manner shown in FIGURE 2 to provide greater friction and gripping force about the temple portion and hence prevent their removal upon being dropped into the water or impacted into the water.

An additional embodiment of this invention is represented by the apparatus of FIGURES 3 and 4 wherein an O-ring 56 is adapted to be interlocked with another ring member 58 and used in such a manner in the assembly of the float that the relatively larger ring 58 is encircled about the pin 34 at the one, usually the smaller rearward, end of the float permitting O-ring 56 to have a greater degree of expandability in those instances in which the floats are used upon eyeglasses wherein the ear portion 54 is relatively wide or thick. It was found that when threading the O-rings upon the temple portion over the ear portion, the second O-ring was difficult to thread, especially in those instances where the ear portion was relatively wide or thick. This is due to the tensions and stress existing in the threading operation. Modifying at least one of the two O-rings in this manner solved the problem. Although the rings 56 and 58 are shown in FIGURES 3 and 4 as being at 90° to each other, this is not to be held as limiting as it is contemplated that any means in which the resilient O-ring 56 is given a freer movement other than the restricted movement it normally has when assembled in accordance with the manner shown in FIGURE 1 is deemed acceptable. For example, the two rings system may be molded as a resilient unit wherein the circular portion for attachment about the pin 34 has its axis parallel to the resilient portion 56, or in the alternative be molded in the manner described in FIGURES 3 and 4 wherein the axii are perpendicular to one another.

In FIGURE 5 an alternate embodiment of this invention is disclosed wherein a typical float 10 has heretofore described in this invention for use upon spectacles or eyeglasses and the like it is considered as applicable for use wherein a chain member 60 is adapted to be encircled through a resilient O-ring 44, for example, to retain a typical key 62 and hence provide a float for a marine boat key, or any other type of key that may accidentally be dropped in the water.

Although this invention has been described with a certain degree of particularity, it is understood that the present disclosure has been made only by way of example and that other changes in the details of construction, and arrangement of parts may be resorted to without depart-

I claim:

1. A float for attachment to the temple portion of spectacles, comprising,
an elongated and substantially cylindrical gas filled float formed from solvent sealed male and female molded halves of synthetic resin,
two spaced recesses along a line parallel to the elongated axis of said float, said recesses formed at the mating edges of the float halves,
a pin in each of said recesses extending substantially perpendicular to the plane of said axis and said line,
a resilient ring positioned over each of said pins and locked upon sealing said halves in such normal position that the cylindrical axes of said rings are substantially parallel to said pins until placed about the temple portion of said spectacles wherein said rings become twisted about said pins to assume a position with their said axes substantially 90° from said normal position.

2. A float of the type in claim 1 wherein another resilient ring is interconnected within one of said resilient rings.

References Cited

UNITED STATES PATENTS

| | | | |
|---|---|---|---|
| 2,251,721 | 8/1941 | Shepherd | 43—43.1 |
| 2,270,487 | 1/1942 | Withey | 43—42.35 X |
| 2,415,692 | 2/1947 | Huston | 43—44.95 |
| 2,858,733 | 11/1958 | Lodewick et al. | 351—157 |
| 3,016,796 | 1/1962 | Boothe | 351—43 |
| 3,038,375 | 6/1962 | Gansz | 351—43 |

DAVID H. RUBIN, *Primary Examiner.*

J. W. LEONARD, *Assistant Examiner.*